United States Patent [19]

Sawan

[11] 4,347,634

[45] Sep. 7, 1982

[54] PRECISION PIPE CUTTER AND REAMER COMBINATION

[76] Inventor: Anis S. Sawan, 1025 S. Magnolia, El Cajon, Calif. 92020

[21] Appl. No.: 177,904

[22] Filed: Aug. 14, 1980

[51] Int. Cl.³ .................. B25F 3/00; B23D 21/06
[52] U.S. Cl. ................................. 7/157; 83/441;
  83/881; 30/102; 30/144; 30/205
[58] Field of Search .......... 30/388, 390, 391, 373,
  30/375, 377, 166, 205, 123, 144, 92, 93, 102;
  7/157; 82/99 A, 100; 408/221; 83/441, 881,
  411; 81/9.5 R, 9.5 C

[56] References Cited

U.S. PATENT DOCUMENTS

| 2,248,694 | 7/1941 | Boyette | 30/373 |
| 2,513,842 | 7/1950 | Cann | 30/102 |
| 2,532,982 | 12/1950 | DeYoung | 30/390 |
| 2,557,737 | 6/1951 | Franck | 30/102 |
| 2,563,483 | 8/1951 | O'Hagan | 30/123 |
| 2,973,576 | 3/1961 | Hentke | 30/92 |

FOREIGN PATENT DOCUMENTS 326259 4/1958 Switzerland ............ 30/390

Primary Examiner—Roscoe V. Parker
Attorney, Agent, or Firm—Charmasson, Branscomb & Holz

[57] ABSTRACT

A precision hand-held pipe cutting tool is provided utilizing an elongated body which is hand-gripped and contains an axially aligned motor, and a rotating saw blade parallel and adjacent to an angularly adjustable dial with a variety of depth limiting notches in the circumference thereof such that a pipe may be cut all, or part way, through, or provided with an annular channel. The tool also incorporates an integral reamer which de-burrs the interior edge of the cut pipe.

8 Claims, 10 Drawing Figures

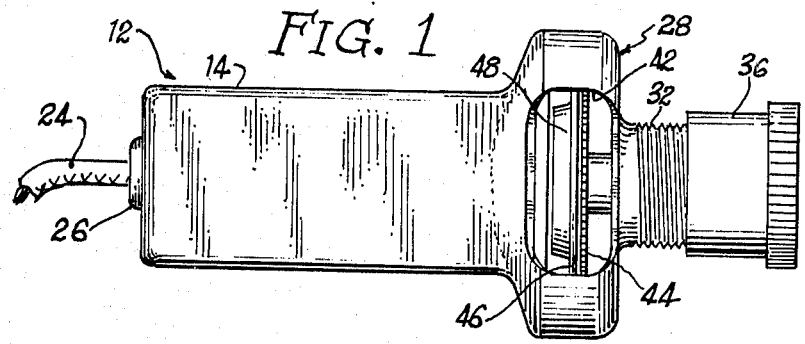
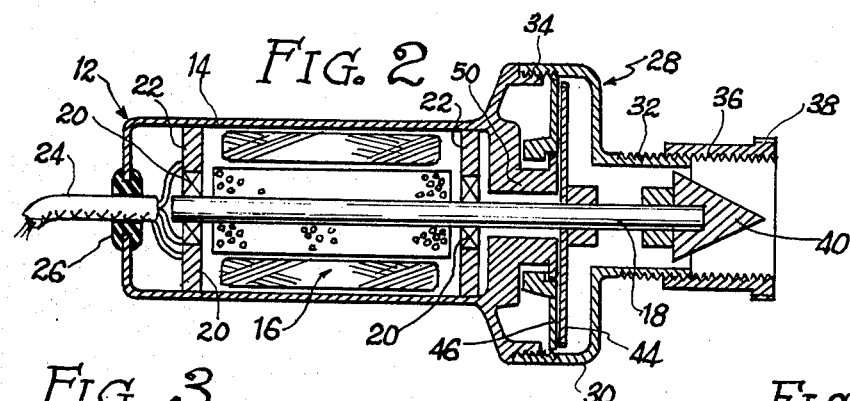
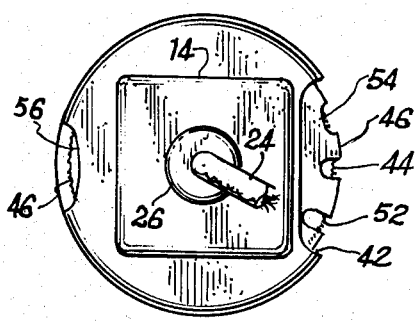
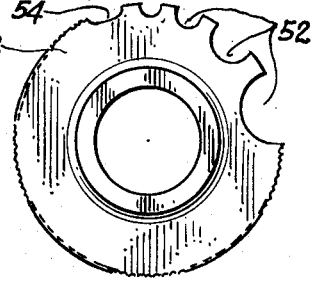
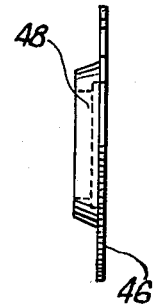
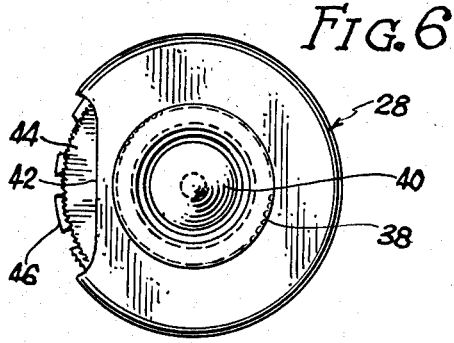

PRECISION PIPE CUTTER AND REAMER COMBINATION

BACKGROUND AND SUMMARY OF THE DISCLOSURE

On-site pipe cutting is ordinarily accomplished by means of the pipe-cutting device of the type which has a rotary knife edge and opposed rollers mounted on a screw such that as the screw is progressively tightened and the handle of the device orbits the pipe, the rotary knife edge cuts through the pipe in short order. The pipe, or at least copper pipe, can also be cut with shears or the like but, of course, this pinches the end and it can no longer be connected easily to another pipe or to a pipe junction.

The rotary pipe cutter mentioned above makes a nice cut but is limited in that first of all if the pipe is cut after it has been installed there must be clearance in all directions around the portion to be cut for the handle of the cutter to pass, and this is not always the case. Additionally, it is sometimes desirable to cut the pipe half of the way through from one side, or put a circumferential channel or score mark on the pipe in a more precise fashion than that available with the conventional rotary cutter.

In order to achieve either of these, a band saw with a suitable jig, or other shop equipment could be used, but there is a need for an on-site device easily used by the workman at the jobsite to accomplish the same end.

To meet the needs as stated above a tool is provided utilizing a hand-held housing with a motor inside which drives a circular saw blade adjacent a coaxial adjustable depth gauge dial having a variety of notches in the circumference to limit the insertion of a pipe. The depth gauge dial is located through a thumb notch in the housing to select the notch that will appropriately permit the saw blade to cut halfway or all the way through, or simply put a shallow channel around the circumference of the pipe, as desired.

The invention is provided in two slight variations in which the rotary saw blade rotates coaxially with, and on an axle that is orthogonal to, the motor shaft, respectively. Additionally, there is provided a rotary reamer in the form of an abrasive cone mounted on one end of the motor shaft and having an adjustable collar selectively extensible to protect or expose the reamer in various degrees.

BRIEF DESCRIPTION OF THE DRAWINGS

FIG. 1 is a side elevation view of the pipe cutter;

FIG. 2 is a longitudinal sectional view of the pipe cutter;

FIG. 3 is an elevation view of the pipe cutter from the left end in FIG. 1;

FIG. 4 is a plan view of the depth limiter dial;

FIG. 5 is a side elevation view of the depth limiter dial in FIG. 4;

FIG. 6 is an end elevation view from the right end of FIG. 1;

DETAILED DESCRIPTION OF THE PREFERRED EMBODIMENT

Figure 7:
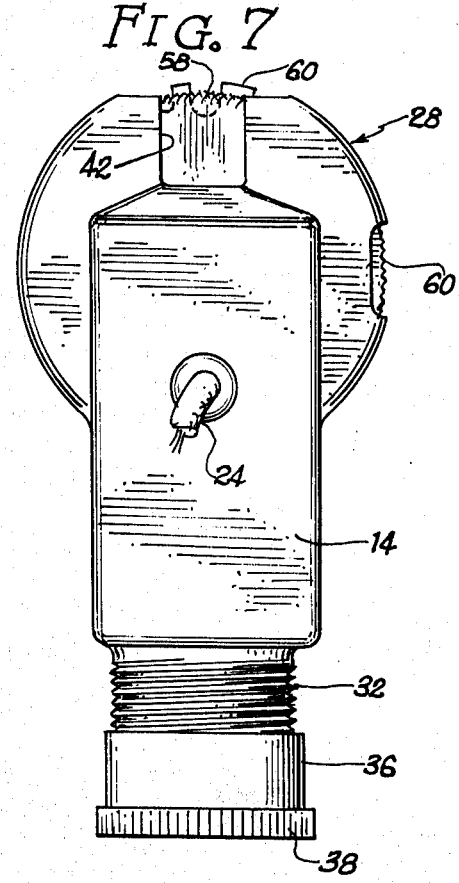
FIG. 7 is a rear elevation view of a modification of the pipe cutter.

As best seen in FIGS. 1 and 2, the pipe cutter is mounted in a housing 12 having a body portion 14 which is rectangular in cross-section in the illustrated embodiment and doubles as a hand grip and a housing for the internally contained electrical motor 16 which is a shaft 18 journaled in bearings 20 mounted in end plates 22. The motor 16 is somewhat diagrammatically illustrated and is powered by an electric cord 24 entering the rear of the housing 12 through a grommet 26.

The front of the housing 12 defines a head 28 with an enlarged, generally disc-shaped portion 30 and an extended open snout 32. The heat 28 is threadedly engaged on the body 14 at 34. A sleeve 36 with a knurled rib 38 is threadedly engaged on the snout 32 to expose or cover up the conical reamer 40 mounted on the end of the motor shaft 18. The purpose of the reamer, of course, is to remove the rough inner edge of a pipe end and the purpose of the sleeve is to protect the workman from the reamer when he is using the tool for a cutting device as detailed hereinafter.

As shown in FIG. 1, the housing head 28 has an extensive opening 42 cut in one side to expose the circular saw blade 44 which is mounted on the motor shaft 18, and the rotary dial depth gauge 46 which defines an enlarged annular boss 48 which snaps onto a cylindrical neck 50 extending from the body 14. The dial is detailed in FIGS. 4 and 5 wherein it can be seen that a plurality of notches 52 are defined in the circumference of the dial to accommodate pipes of different diameters and in some instances to permit a pipe that is oversized for a particular notch to be cut only halfway through. Elongated, shallow notches 54 may be used in order to circumferentially score the pipe without cutting all the way through. To provide access to the dial for rotation a second opening 56 is provided in the housing head which can best be seen in FIG. 3.

Figure 10:
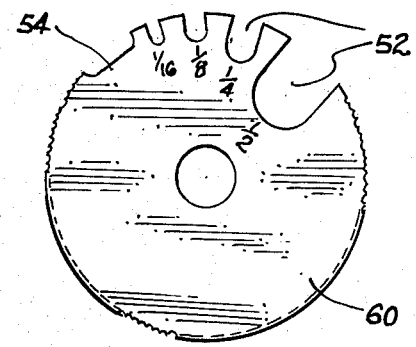
FIG. 10 is a plan view of the depth limiter dial.

The tool is small and easy to use, and is especially handy for pipes that are already in place where a typical rotational pipe cutter would not fit. To further adapt the tool for tight spaces, and spaces in which the embodiment shown in FIGS. 1 through 6 might not accommodate, a second embodiment is shown in FIGS. 7 through 10. The only substantial functional difference in the second embodiment is that the blade 58 and the dial 60 rotate on an axis that is perpendicular to the axis of the motor. To accommodate this orientational change a lateral rotary shaft 62 is journaled at its ends in bearings 64 and rotated by fixed bevel gear 66 which is driven by bevel gear 68 mounted on motor shaft 70. Shaft 62 mounts the blade 58 and the modified dial 60, showing plan form in FIG. 10, is frictionally engaged on one of the bearings 64 which has a circular outer diameter.

Figure 8:
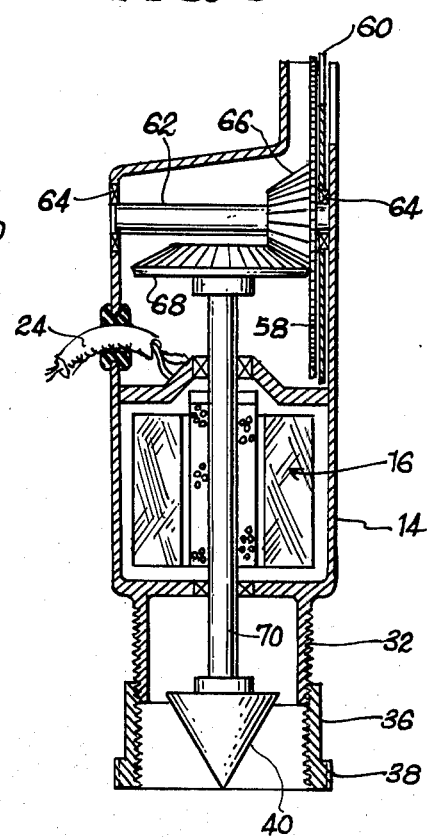
FIG. 8 is an elevational view from the right side of FIG. 7 with portions cut away.
Figure 9:
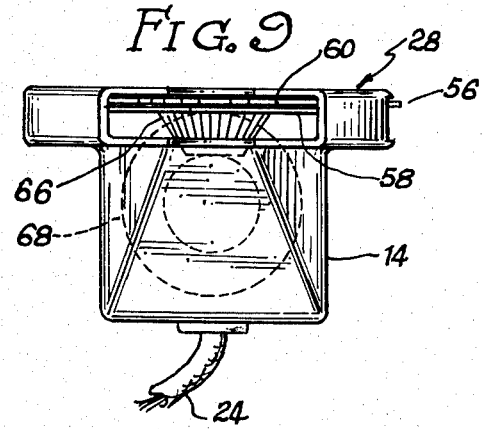
FIG. 9 is a top elevation view of the cutter of FIG. 7.

In the second embodiment, the reamer 40 comes out of the other end of the cutter as shown in FIG. 8, and other functional aspects of the device are identical to those discussed and referenced in the first embodiment.

The cutting tool as represented in either of the embodiments disclosed herein provides the worker with not only a labor saving device but with the ability to cut pipes which are mounted flat against the surface, to cut pipes part way through from one side, to make circumferential scores which do not penetrate the pipe, and angular cuts are also possible which are not possible with a rotary score-type cutter.

I claim:

1. A hand-held pipe cutter comprising:
 (a) a housing adapted to be hand held;
 (b) a depth limiter plate mounted in said housing and having an edge defining a plurality of guide notches of graduated sizes;
 (c) said housing having an opening sufficiently large and suitably positioned when aligned to expose at least one of said notches at a time, including the largest notch, and said housing and plate being mutually movable to selectably expose different ones of said notches through said openings; and
 (d) a powered cutting blade passing adjacent said plate and over at least a portion of a notch exposed by said opening to cut an object guided therein.

2. A hand-held precision pipe cutter comprising:
 (a) a housing adapted to be hand-held;
 (b) a depth limiter circular dial mounted in said housing and defining a plurality of guide notches re-entrant into the circumference of said dial and said housing being adapted to expose at least one of said notches at a time; and said dial being rotatably mounted to sequentially and selectively expose said notches through said housing.
 (c) a powered cutting blade passing parallel to said dial adjacent to the notch exposed through said housing to cut a tube extended through said exposed notch.

3. A structure according to claim 2 wherein said blade is circular and coaxial with said dial.

4. A structure according to claim 3 wherein said housing defines a body portion adapted to be hand-held and an expanded disc portion housing said dial and blade, said dial is frictionally journaled in said disc portion and the latter has a peripheral thumb notch exposing the edge of said dial for thumb rotation.

5. A structure according to claim 4 wherein said body portion houses a motor to drive said blade, said disc portion is defined on the end of said body portion generally coaxial with said motor, and said motor has a driveshaft extending through and beyond said body portion and mounts a rotary reamer on the end thereof.

6. A structure according to claim 4 wherein said body portion houses a motor to drive said blade, said disc portion is defined at one end of said body portion with the disc portion axis being laterally oriented relative to said body portion and said motor has a shaft extending out the other end of said body portion and having a rotary reamer thereon.

7. A structure according to claim 5 or 6 and including a protective sleeve extending from said body portion through which said rotary reamer extends to define a protective sleeve to act as a safety guard for said reamer.

8. A structure according to claim 7 wherein said sleeve is externally knurled and threadedly engaged on said body portion whereby same is adjustable to provide variable access space to said reamer.

* * * * *